United States Patent
Baelde et al.

(10) Patent No.: US 11,747,307 B2
(45) Date of Patent: Sep. 5, 2023

(54) METHOD AND SYSTEM FOR THE NON-DESTRUCTIVE TESTING OF A MECHANICAL PART

(71) Applicants: SAFRAN, Paris (FR); CENTRE NATIONAL DE LA RECHERCHE SCIENTIFIQUE, Paris (FR)

(72) Inventors: Aurélien Baelde, Moissy-Cramayel (FR); Claire Prada, Paris (FR); Frédéric Jenson, Moissy-Cramayel (FR)

(73) Assignees: SAFRAN, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 496 days.

(21) Appl. No.: 17/049,944

(22) PCT Filed: Apr. 19, 2019

(86) PCT No.: PCT/FR2019/050950
§ 371 (c)(1),
(2) Date: Oct. 22, 2020

(87) PCT Pub. No.: WO2019/207243
PCT Pub. Date: Oct. 31, 2019

(65) Prior Publication Data
US 2021/0239652 A1   Aug. 5, 2021

(30) Foreign Application Priority Data
Apr. 23, 2018 (FR) ........................ 1853544

(51) Int. Cl.
*G01N 29/04* (2006.01)
*G01N 29/26* (2006.01)

(52) U.S. Cl.
CPC ........ *G01N 29/043* (2013.01); *G01N 29/262* (2013.01); *G01N 2291/0289* (2013.01); *G01N 2291/106* (2013.01)

(58) Field of Classification Search
CPC .............. G01N 29/043; G01N 29/262; G01N 29/4463; G01N 29/46; G01N 2291/0289; G01N 2291/106; G01N 2291/0258
(Continued)

(56) References Cited

U.S. PATENT DOCUMENTS 10,261,054 B2 * 4/2019 Dominguez ........... G01N 29/14
11,085,900 B2 * 8/2021 Baelde .................. G01N 29/11
(Continued)

FOREIGN PATENT DOCUMENTS

EP     1550863 A2    7/2005
WO   2010001027 A1   1/2010

OTHER PUBLICATIONS

International Search Report in corresponding Application No. PCT/FR2019/050950, dated Sep. 16, 2019, (2 pages).
(Continued)

*Primary Examiner* — Jacques M Saint Surin
(74) *Attorney, Agent, or Firm* — Bookoff McAndrews, PLLC

(57) ABSTRACT

A method for non-destructive testing of a mechanical part by a multi-element transducer having piezoelectric elements, where:
for each element e(i) of the transducer, the emission of an ultrasonic wave at a given frequency and measurement, by each element e(j) distinct from the element e(i), of a time-varying signal kij(t) representing the back-scattered ultrasonic wave received by the element e(j);
the determination of a first matrix of time-varying components based on measured signals kij(t), i, j=1, . . . , N;

(Continued)

the determination of a second matrix of frequency components corresponding to a determined frequency based on the frequency of the ultrasonic wave by applying a Fourier transform to said first matrix;

the filtering of said second matrix comprising a projection of it onto a single scattering sub-space determined by means of a numerical calculation using a ray tracing algorithm; and the verification of the integrity of the mechanical part by using said filtered second matrix.

12 Claims, 4 Drawing Sheets

(58) Field of Classification Search
USPC .......................................................... 73/627
See application file for complete search history.

(56) References Cited

U.S. PATENT DOCUMENTS

| 11,300,545 | B2* | 4/2022 | Weihnacht | G01N 29/245 |
| 11,480,550 | B2* | 10/2022 | Baelde | G01N 29/4418 |
| 2011/0138919 | A1* | 6/2011 | Falter | G01N 29/221 |
| | | | | 73/597 |

OTHER PUBLICATIONS

French Search Report in corresponding Application No. FR1853544, dated Oct. 30, 2018, (2 pages).

C. Prada et al., "Eigenmodes of the time reversal operator: a solution to selective focusing in multiple-target medias," Wave Motion, vol. 20, pp. 151-163, Sep. 1994.

C. Holmes et al., "Post-processing of the full matrix of ultrasonic transmit-receive array data for non-destructive evaluation," NDT&E International, vol. 38, pp. 701-711, Jun. 15, 2005.

* cited by examiner

METHOD AND SYSTEM FOR THE NON-DESTRUCTIVE TESTING OF A MECHANICAL PART

CROSS-REFERENCE TO RELATED APPLICATION(S)

This application is the U.S. national phase entry under 35 U.S.C. § 371 of International Application No. PCT/FR2019/050950, filed on Apr. 19, 2019, which claims priority to French Patent Application No. 1853544, filed on Apr. 23, 2018.

BACKGROUND OF THE INVENTION

The invention relates to the general field of mechanics.

It applies more particularly to the non-destructive testing by ultrasound of mechanical parts, such as for example aeronautical parts such as titanium alloy billets, fan disks or one-piece impellers equipping aircraft engines and particularly turbojets. No limitation is attached, however, to the nature or to the shape of the mechanical parts considered.

In known fashion, a set of methods which allows characterizing the state of integrity and/or the quality of structures or materials without degrading them is called non-destructive testing. Non-destructive testing has a preferred but non-limiting application in the field of aeronautics, and more generally in any other industrial field in which the structures of which it is desired to characterize the condition or the quality are costly and/or their reliability of operation is critical. Non-destructive testing can be advantageously carried out on the structure or the material considered both during production and during use or maintenance.

A certain number of critical mechanical parts equipping aircraft engines, and more particularly turbojets, are made of titanium alloys based on cylindrical billets. In order to ensure the integrity of such mechanical parts before their assembly into a turbojet, it is known to perform non-destructive testing on these parts utilizing the propagation of ultrasonic waves, and allowing the detection of the possible presence of defects or indications of defects in the tested parts. This non-destructive testing is generally performed on the billets and after forging. It is conventional to use for this purpose a transducer (i.e. a sensor) composed of multiple piezoelectric element capable of emitting and of receiving ultrasonic waves.

During non-destructive testing, ultrasonic waves are emitted by the multi-element transducer at a predetermined frequency, and interact with the microstructure of the material of the part, the integrity of which it is desired to verify. An ultrasonic "noise" is measured by the multi-element transducer: this noise is concurrent with the echoes associated with the indications of defects potentially present in the part. More specifically, each element of the multi-element transducer measures a signal comprising several components, namely:

a so-called single scattering component, representing the wave trajectories where the wave propagated in the part interacts only once with the material of the part (i.e. is reflected only once by the scatterers present in the material of the part, these scatterers possibly being linked to faults present in the part or in the different faces of the part) before being measured by the elements of the multi-element transducer (a back-scattered wave received by the elements of the multi-element transducer is another term used);

possibly a so-called multiple scattering component, representing the wave trajectories where the wave propagated in the mechanical part interacts several times with the material of the mechanical part (i.e. is the object of several successive reflections by scatterers present in the material) before being measured by the elements of the multi-element transducer; and an electronic noise component.

The utilization of a multi-element transducer advantageously offers the possibility of applying digital (matrix) filtering to the signals measured by the transducer allowing a reduction in the electronic noise component, and possibly the multiple diffraction component, present in these signals to the benefit of the components reflecting the presence, if any, of indications of defects in the mechanical part. This allows an improvement in the analysis of the observed measured signals for testing the integrity of the mechanical part, and possibly the detection of defects in the mechanical part.

Document WO 2010/001027 describes a digital filtering method based on the separation of the single scattering component from the multiple scattering component. This method consists of projecting the signals measured by the multi-element transducer onto a sub-space characteristic of the single scattering regime and estimated theoretically based on the propagation properties of the material of the tested part (speed of propagation of the wave in the material and wave number in particular). This theoretical estimate relies on the assumption of a flat interface between the multi-element transducer and the mechanical part, the multi-element transducer being placed in direct contact with the mechanical part.

In practice, non-destructive testing performed on aeronautical parts, and particularly on the billets mentioned previously, are often accomplished in submersion in order to allow rapid inspection of the entire volume of the parts. In this context, the multi-element transducer is displaced around the submerged part and it is not always possible to position it in direct contact with the mechanical part. In addition, the mechanical parts of which it is desired to verify the integrity are not always flat: on the contrary they can have more complex shapes, such as for example cylindrical, spherical or any other shape, which do not correspond to the assumptions of document WO 2010/001027.

There is therefore a need for a digital filtering technique which can be used for non-destructive testing by ultrasound of a mechanical part, regardless of the shape if this mechanical part and of the interface between the mechanical part and the multi-element transducer capable of emitting ultrasonic waves.

OBJECT AND SUMMARY OF THE INVENTION

The present invention responds in particular to this need by proposing a method for the non-destructive testing of a mechanical part by propagation of ultrasonic waves accomplished by means of a multi-element transducer placed opposite the mechanical part and comprising a plurality of piezoelectric elements $e(1), e(2), \ldots, e(N)$, N designating an integer greater than 1, this testing method comprising:

a measuring step comprising, for each element $e(i)$ of the transducer, the emission of an ultrasonic wave at a given frequency and the measurement, by each element $e(j)$ of the transducer distinct from the element $e(i)$, of a time-varying signal denoted $k_{ij}(t)$ representing the back-scattered ultrasound wave received by the element $e(j)$;

a step of determining at least one first matrix of time-varying components based on the measured signals kij(t), i, j=1, . . . , N, taken over a predetermined duration around a time reference denoted T;

a step of determining at least one second matrix of frequency components corresponding to a predetermined frequency based on the frequency of the sound wave by applying a Fourier transformation to the time-varying components of said at least one first matrix;

a step of filtering said at least one second matrix comprising a projection of said at least one second matrix of frequency components onto a single scattering sub-space; and a step of verifying the integrity of the mechanical part by using said at least one filtered second matrix.

The testing method is remarkable in that the single scattering sub-space used during the filtering step is determined by means of a numerical calculation using a ray-tracing algorithm.

For example, in a particular embodiment, the step of filtering the second matrix comprises:

a step of determining the single scattering sub-space, said single scattering sub-space being defined based on a base of 2N−1 matrices denoted Em, m=1, . . . , 2N−1, said determining step comprising:

for each couple of distinct elements e(i) and e(j) of the transducer, i, j, =1, . . . , N, a numerical calculation step using a ray-tracing algorithm, for a plurality D of scatterers denoted Pd, d=1 . . . , D distributed in various points of the mechanical part and located at a depth determined from the time reference T, of a propagation time tijd of an ultrasonic wave emitted by the element e(i), diffracted by the scatterer Pd and received by the element e(j), the propagation time tijd being calculated taking into account the shape of the mechanical part, the placement of the transducer and the media in which the ultrasonic wave is propagated between the elements e(i) and e(j) of the transducer and the scatterer Pd;

a step of estimating a contribution of single scattering in the frequency components of the second matrix, based on the propagation times calculated for each couple of distinct elements e(i) and e(j) of the transducer, said estimating step supplying a third matrix;

a step of extracting the frequency components from a central anti-diagonal of the third matrix to construct the matrix base Em, m=1, . . . , 2N−1 defining the single scattering sub-space;

a step of projecting said at least one second matrix onto each of the matrices Em, m=1, . . . , 2N−1 of the base of 2N−1 matrices; and a step of evaluating said at least one filtered second matrix based on the matrices Em of the base weighted by the projections obtained during the projection step.

As a corollary, the invention also encompasses a system for non-destructive testing of a mechanical part comprising:

a multi-element transducer placed opposite the mechanical part and capable of emitting ultrasonic waves, said transducer comprising a plurality of piezoelectric elements e(1), e(2), . . . , e(N), N designating an integer greater than 1, said transducer being configured to emit, via each element e(i) of the transducer, an ultrasonic wave at a given frequency, and to measure, via each element e(j) of the transducer distinct from the element e(i), a time-varying signal denoted kij(t) representing the back-scattered ultrasonic wave received by the element e(j);

a validation device comprising:

a first determination module, configured to determine at least one first matrix of time-varying components based on the measured signals kij(t), i, j=1, . . . , N, taken for a predetermined duration around a time reference denoted T;

a second determination module, configured to determine at least one second matrix of frequency components corresponding to a frequency determined based on the frequency of the sound wave by applying a Fourier transformation to the time-varying components of said at least one first matrix;

a filtering module, configured to filter said at least one second matrix by projecting said at least one second matrix of frequency components onto a single scattering sub-space; and an analysis module, configured to verify the integrity of the mechanical part by using said at least one filtered second matrix;

the testing system being remarkable in that the filtering module is configured to determine the single scattering sub-space by means of a numerical calculation using a ray-tracing algorithm.

In a particular embodiment, the filtering module comprises in particular:

a third determination module, configured to determine the single scattering sub-space based on a base of 2N−1 matrices denoted Em, m=1, . . . , 2N−1, said third determination module being configured to:

for each couple of distinct elements e(i) and e(j) of the transducer, i, j, =1, . . . , N, calculate numerically, but using a ray-tracing algorithm, for a plurality D of scatterers denoted Pd, d=1 . . . , D distributed in various points of the mechanical part and situated at a depth determined from the time reference T, a propagation time tijd of an ultrasonic wave emitted by the element e(i), diffracted by the scatterer Pd and back-scattered by the element e(j), said propagation time being calculated taking into account the shape of the mechanical part, the placement of the transducer and the media in which the ultrasonic wave is propagated between the elements e(i) and e(j) of the transducer and the scatterer Pd;

estimate a contribution of single scattering in the frequency components of the second matrix based on the propagation times calculated for each couple of distinct elements e(i) and e(j) of the transducer, and obtaining a third matrix based on the estimated contributions;

extract frequency components from a central anti-diagonal of the third matrix to construct the matrix base Em, m=1, . . . , 2N−1 defining the single scattering sub-space;

a projection module, configured to project said at least one second matrix onto each of the matrices Em, m=1, . . . , 2N−1 of the base of 2N−1 matrices; and an evaluation module configured to evaluate said at least one filtered second matrix based on the matrices Em of the base weighted by the projections obtained during the projection step.

The invention proposes digital filtering in the frequency domain of signals measured by the multi-element transducer which no longer rely, unlike the method proposed in document WO 2010/001027, on a theoretical estimate of this single scattering sub-space based on a certain number of assumptions relating to the interface between the mechanical part and the multi-element transducer, but rather on a numerically calculated single scattering sub-space. This numerical calculation uses a ray-tracing (or launching) algorithm, which advantageously allows realistic simulation of the propagation of ultrasonic waves emitted by the multi-element transducer in the mechanical part.

More precisely, the ray-tracing algorithm used proposes to link the elements of the multi-element transducer with the scatterers belonging to the mechanical part by paths compatible with the laws of physics, and particularly with the Snell-Descartes laws. This allows good characterization of the physical phenomena which occur during the emission of ultrasonic waves by the multi-element transducer toward the mechanical part that it is desired to test (ex: penetration into the mechanical part, reflection(s) by the scatterers belonging to the material of the mechanical part, then return to the elements of the transducer). In addition, the paths simulated by means of the ray-tracing algorithm take into account the shape of the physical part (at the points of entry and exit of the ultrasonic waves in the mechanical part).

The utilization of an algorithm of this type therefore allows taking into account the conditions in which the non-destructive testing is carried out and thereby being able to relax the constraints on these conditions, for example as regards the shape of the mechanical part, the integrity of which it is desired to verify, the placement of the transducer relative to the mechanical part, the media in which the ultrasonic wave is propagated between the elements of the multi-element transducer and the scatterers belonging to the mechanical part, etc. It leads to an accurate numerical calculation, resulting in an improvement in the quality of the non-destructive testing performed and in the detection of defects, if any, in the mechanical part.

The invention therefore proposes digital filtering of the signals measured by a multi-element transducer during non-destructive testing of a mechanical part which can be used regardless of the shape of the mechanical part and regardless of the interface between the multi-element transducer and the mechanical part. It is sufficient, in fact, for using the invention, that the multi-element transducer be positioned opposite the mechanical part, i.e. facing the mechanical part (in direct contact or not) in order for the ultrasonic waves emitted by the transducer be able to propagate in the part. Furthermore, the transducer can be displaced around the part in order to allow the inspection of the entire volume of the part and thus facilitate its testing. The non-destructive testing method proposed by the invention is therefore not dependent on direct contact between the multi-element transducer and the mechanical part, or the flat shape of the latter. It can easily be used for the non-destructive testing of complex parts such as aeronautical parts and in particular billets, impellers or fan disks as mentioned previously, including when these parts are placed in submersion.

In one particular embodiment of the invention, each propagation time $tijd$ is calculated according to:

$$tijd = \min_{P_e} tid(Pe) + \min_{P_s} tdj(Ps)$$

where Pe designates an entry point with coordinates (xe, ze) of the ultrasonic wave into the mechanical part and Ps an exit point with coordinates (xs, zs) of the ultrasonic wave diffracted by the point Xd with coordinates (xd, zd), with:

$$tid(x) = \frac{\sqrt{(xe-xi)^2 + (ze-zi)^2}}{c1} + \frac{\sqrt{(xd-xe)^2 + (zd-ze)^2}}{c2}$$

and $$tdj(x) = \frac{\sqrt{(xd-xs)^2 + (zd-zs)^2}}{c2} + \frac{\sqrt{(xs-xj)^2 + (zs-zj)^2}}{c1}$$

where c1 designates the propagation speed of the ultrasonic wave in the medium separating the transducer from the mechanical part and c2 designates the propagation speed of the ultrasonic wave in the mechanical part.

This mode of propagation time calculation takes into account both the shape of the transducer (linear, matrix or other), the nature of the interface between the transducer and the mechanical part (placement configuration, for example, of the transducer relative to the mechanical part), and of the shape of the mechanical part.

In one particular embodiment, said at least one second matrix is determined at the frequency of the ultrasonic wave.

As a variant, several second matrices are determined at a plurality of frequencies contained in a predetermined interval defined around the frequency of the ultrasonic wave.

Furthermore, in another particular embodiment, several first matrices corresponding to different time references and/or to different predetermined durations are determined.

These different embodiments allow improving the accuracy of the non-destructive testing. The time references considered typically correspond to depths in the mechanical part where the presence of defects is suspected. If a depth of this type is known, it is sufficient to focus on a time reference corresponding to the propagation time of ultrasonic waves until this depth. If no indications on the location of possible defects are available, several time reference and predetermined durations around these time references can be considered to improve the testing performed.

It is noted that no limitation is attached to the technique used to verify the actual integrity of the mechanical part from the filtered second matrix(ces) conforming to the invention. For example, the step of verifying the integrity of the mechanical part can use a DORT technique of diagonalization of the time reversal operator or a total focusing method, known per se. The contribution of the invention resides more on the filtering of the signal measured by the multi-element transducer: this filtering is improved, which allows reducing the noise that is present in the signals used for the actual non-destructive testing, regardless of the method used for this purpose.

In a particular embodiment of the testing system according to the invention, the invention also comprises a robotic arm on which is placed the multi-element transducer, said robotic arm being configured to allow displacement of the multi-element transducer around the mechanical part.

As mentioned previously, thanks to the mobility of the multi-element transducer around the mechanical part, it is possible to easily observe the entire volume of the part and to propose a more effective and more rapid non-destructive testing.

It is appropriate to note that the invention applies to different types of multi-element transducers. This can be linear, but also matrix, or even have a more complex shape.

BRIEF DESCRIPTION OF THE DRAWINGS

Other features and advantages of the present invention will be revealed by the description given below, with reference to the appended drawings which illustrate one embodiment of it without any limiting character. In the figures.

DETAILED DESCRIPTION OF THE INVENTION

Figure 1:
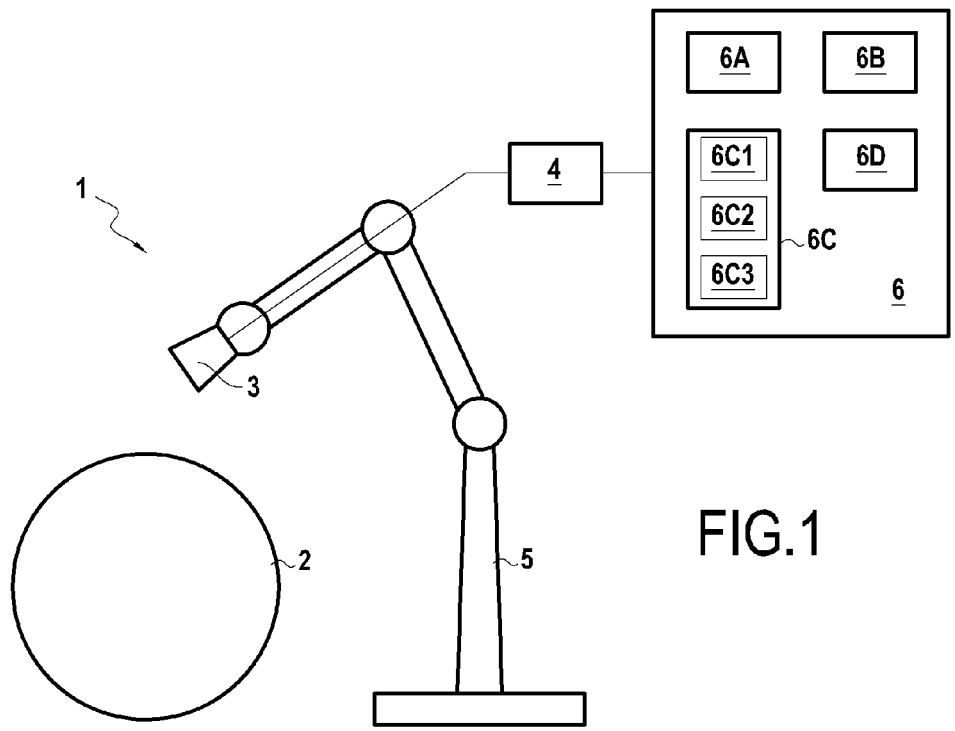
FIG. 1 shows, in its environment, a non-destructive testing system conforming to the invention, in a particular embodiment.

FIG. 1 shows, in its environment, a non-destructive testing system 1 in conformity with the invention, in a particular embodiment.

In the example considered in FIG. 1, the non-destructive testing system 1 is used by way of illustration to accomplish testing the integrity of a mechanical part 2 of cylindrical shape. Here for example, this mechanical part is a titanium alloy billet as mentioned previously, and used for the design of aeronautical parts intended to equip an aircraft engine such as a turbojet.

Of course this example is given only by way of illustration, and the invention applies to other mechanical parts, regardless of their purpose and of any shape (for example a one-piece impeller or a fan disk of an aircraft engine).

In conformity with the invention, the non-destructive testing system 1 comprises:

- a multi-element transducer 3 (linear here), comprising a plurality of piezoelectric elements e(1), e(2), . . . , e(N), N designating an integer greater than 1. Each piezoelectric element e(i) of the transducer is capable of emitting an ultrasonic wave at a given frequency; each piezoelectric element e(j), j≠i, of the transducer is capable of measuring a time-varying signal denoted kij(t) representing the ultrasonic wave emitted by the piezoelectric element e(i) and back-scattered, received by the element e(j). In the embodiment described here, the multi-element transducer 3 is controlled by a multi-channel amplifier 4, known per se, and not described in detail here. This is capable of generating and of amplifying the N signals (ultrasonic waves) intended to be applied to the piezoelectric element, and to apply them independently on each of the piezoelectric elements; it is also able to amplify the signals measured by each piezoelectric element;
- a robotic arm 5 on which is positioned the multi-element transducer and which allows placing the multi-element transducer opposite the mechanical part 2 to be tested. The robotic arm 5 can also be configured to displace the multi-element transducer 3 around the mechanical part 2 in order to facilitate the examination of the entire volume of the part; and
- a device 6 for validating the mechanical part 2, conforming to the invention, capable of using the signals measured by the multi-element transducer in response to the ultrasonic waves propagated in the mechanical part 2 to determine whether or not the mechanical part 2 contains indications of defects.

It is noted that no limitation is attached to the shape of the multi-element transducer 3. In the embodiment described here, it is linear, but other shapes can be considered (for example square, rectangular, etc.).

The non-destructive testing of the mechanical part 2 can also be accomplished by submerging the mechanical part 2 in a testing tank (not shown in FIG. 1) containing a liquid body, such as water for example, to favor the transfer of ultrasonic energy from the multi-element transducer to the mechanical part 2.

Figure 2:
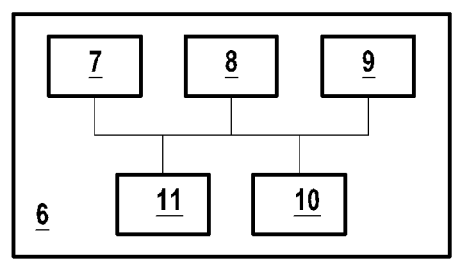
FIG. 2 shows an example of hardware architecture of a validation device belonging to the non-destructive testing system of FIG. 1.

In the embodiment described here, the validation device 6 is a computer, the hardware architecture of which is illustrated in FIG. 2.

It comprises in particular a processor 7, a random access memory 8, a read-only memory 9, a non-volatile flash memory 10 as well as communication means 11 allowing the validation device 6 in particular to communicate with the multi-channel amplifier 4 to recover in particular the signals measured by the multi-element transducer 3. These communication means comprise for example a digital data buss or, if the validation device 6 and the multi-channel amplifier 4 are connected via a telecommunications network (local or other, wired or wireless, etc.), a network card or an interface allowing communication on this network.

The read-only memory 9 of the validation device 6 constitutes a recording medium, readable by the processor 7 and on which is recorded a computer program (or a set of computer programs), PROG. This computer program PROG comprises a plurality of instructions executable by the processor 7, and which define different functional modules and software, here of the validation device 6, these functional modules relying on and/or controlling the hardware element 7-11 of the validation device mentioned previously. Here they comprise in particular, as illustrated in FIG. 1:

- a first determination module 6A, configured to determine at least one first matrix of time-varying components from the signals kij(t) measured by the multi-element transducer 3, i, j=1, . . . , N, taken over a predetermined duration denoted ΔT around a time reference denoted T;
- a second determination module 6B, configured to determine at least one second matrix of frequency components corresponding to a frequency determined from the frequency of the ultrasonic waves emitted by the multi-element transducer 3, this module 6B being configured to this end to apply a Fourier transformation to the time-varying components of said at least one first matrix;
- a filtering module 6C, configured to filter said at least one second matrix by projecting it onto a single scattering sub-space; and
- an analysis module 6D, configured to verify the integrity of the mechanical part by using said at least one filtered second matrix obtained by the filtering module 6C.

The filtering module 6C of the validation device 6 itself comprises a plurality of modules, defined by the instructions of the computer program PROG, comprising in particular:

- a third determination module 6C1, configured to determine the single scattering sub-space used by the filtering module 6C. This single scattering subset is defined based on a base of 2N−1 matrices denoted Em, m=1, ..., 2N−1. To determine this base, the third determination module 6C1 is configured to:
- for each couple of distinct elements e(i) and e(j) of the multi-element transducer 3, i, j=1, ..., N, calculate numerically by using a ray-tracing algorithm, for a plurality D of scatterers denoted Pd, d=1 ..., D distributed in various points of the mechanical part 2 and located at a depth determined depending on the time reference T, a propagation time tijd of an ultrasonic wave emitted by the element e(j), said propagation time being calculated by taking into account the shape of the mechanical part, the placement of the transducer and the media in which the ultrasonic wave is propagated between the elements e(i) and e(j) of the transducer and the scatterer Pd;
- a estimate a contribution of single scattering in the frequency components of the second matrix based on the propagation times calculated for each couple of distinct elements e(i) and e(j) of the transducer, and obtain a third matrix based on the estimated contributions;
- extract frequency components from a central antidiagonal of the third matrix to construct the base of matrices Em, m=1, ..., 2N−1 defining the single scattering sub-space;
- a projection module 6C2, configured to project said at least one second matrix onto each of the matrices Em, m=1, ..., 2N−1 of the base of 2N−1 matrices; and
- an evaluation module 6C3 configured to evaluate said at least one filtered second matrix by summing the 2N−1 matrices Em weighted respectively by the projections obtained by the projection module 6C2.

The functions of these modules 6A to 6D are now described in more detail with reference to the steps of the non-destructive testing method according to the invention.

Figure 3:
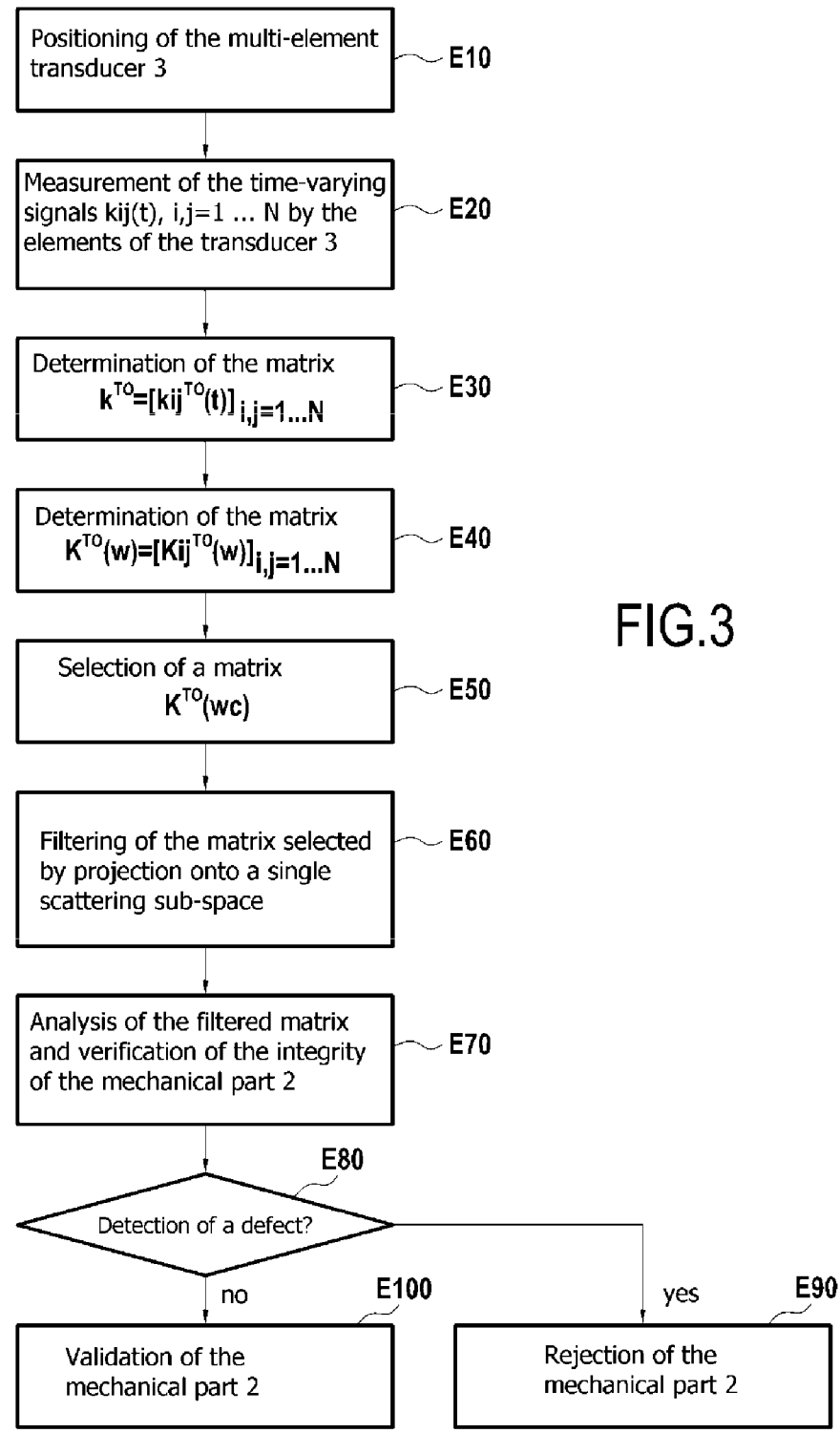
FIG. 3 shows, in the form of a flowchart, the main steps of a non-destructive testing method according to the invention as implemented by the system of FIG. 1.

FIG. 3 shows the principal steps of the non-destructive testing method implemented by the non-destructive testing system 1 to test the integrity of the mechanical part 2, in a particular embodiment of the invention.

It is assumed that the multi-element transducer 3 is positioned and oriented by the robotic arm 5 in a position POS, called the current position, in which it is placed opposite the mechanical part 2 (step E10). No limitation is attached to the selection of the current position POS. However, preferably, the multi-element transducer 3 is positioned at a distance of less than 1 m from the mechanical part 2, which can be adjusted so as to allow the measurement of a sufficient signal level with the multi-element transducer 3 to allow the performance of the digital filtering in conformity with the invention. A signal level of this type can be determined experimentally. It is intrinsically linked here to the characteristics and to the properties of the multi-channel amplifier 4 which is used to amplify the signals received by the transducer element 3 so as to make them usable. Placing the multi-element transducer 3 facing protruding edges of the mechanical part 2 will also be avoided so as to avoid the signal returned by the mechanical part 2 being too low.

Once the multi-element transducer 3 is positioned, the multi-channel amplifier 4 is activated to control the multi-element transducer 3 to perform measurements (step E20). More specifically, each piezoelectric element e(i), i=1, ..., N of the transducer 3 is activated to emit, each in turn, an ultrasonic wave toward the mechanical part 2 at a given frequency, denoted here f0. Following the emission of an ultrasonic wave by a piezoelectric element e(i), the other piezoelectric elements e(j) distinct from the element e(i) are each activated to measure and record over a certain duration a time-varying signal, denoted kij(t) representing the ultrasonic wave back-scattered and received by each of these elements e(j). Each time-varying signal kij(t) thus measured therefore characterizes the response of the material of the mechanical part 2 when the piezoelectric element e(i) emits an ultrasonic wave at the frequency f0 and the element e(j) records the ultrasonic wave back-scattered by the material.

The signals kij(t) thus measured are transmitted by the multi-element transducer 3 to the multi-channel amplifier 4, which transmits them in its turn to the validation device 6. Here they form the components of a so-called inter-element matrix denoted k(t).

The validation device 6 determines, via its first determination module 6a, a first matrix denoted $k^{T0}(t)$ the components of which are time-varying signals extracted from the measured signals kij(t), i, j=1, ..., N, and transmitted to the validation device 6 (step E30). More specifically, the first determination module 6A extracts from each signal kij(t), a time slice $kij^{T0}(t)$ with duration ΔT taken around a time reference denoted T0, and forms with the signals thus extracted the first matrix $k^{T0}$. In other words:

$$k^{T0}(t) = [kij^{T0}(t)]_{i,j=1,\ldots,N}$$

In the embodiment described here, for the sake of simplification, the first determination module 6A determines a single matrix $kij^{T0}(t)$ of which the signals are time-varying signals with duration ΔT around T0. However, in another embodiment, the first determination module 6A can determine several distinct "first" matrices, corresponding to time slices taken around the time references distinct from T0, the duration of these time slices being able to be taken equal to or different from ΔT.

Then the validation device 6, via its second determination module 6B, applies a Fourier transformation to the time-varying components of the first matrix $k^{T0}$ so as to determine a second matrix denoted $K^{T0}(\omega)$ (step E40), where ω designates the pulsing or speed of rotation (in a manner known per se, ω=2πf where f designates the frequency). In the embodiment described here, the Fourier transform applied by the second determination module 6B, is a fast Fourier transform or FFT known per se.

The components denoted $Kij^{T0}(\omega)$ of the matrix $K^{T0}(\omega)$ are consequently frequency components. Each component $Kij^{T0}(\omega)$ of the matrix is a frequency signal, depending on the pulsing ω (or equivalently on the frequency f with ω=2πf as recalled above).

In the embodiment described here, the second determination module 6B then determines, based on the second matrix $K^{T0}(\omega)$, at least one matrix $K^{T0}(\omega)$, the components of which are considered at a pulse ωc=2πfc where fc is a selected frequency in a frequency band with a width Δf around the frequency f0 at which were emitted the ultrasonic waves by the multi-element transducer during step E20 (step E50).

Hereafter in the description, for the sake of simplification, a single matrix, namely the matrix $K^{T0}(\omega c)$ with ωc=2πf0 (second matrix within the meaning of the invention) is considered. However, the second determination module 6B can extract a plurality of matrices based on the matrix $Kij^{T0}(\omega)$ corresponding to different frequencies selected around the frequency f0. In other words, if in addition the first determination module 6A has extracted different matrices $k^T$ from the matrix of signals measured by the multi-element transducer during step E20, the validation device 6 can, as a result of the step E50, have several matrices of frequency signals $Kij^T(\omega)$ available, corresponding to different time references T and/or to time slices, and to different frequencies f or pulses ω=2πf. the following steps are described for the single matrix $K^{T0}(\omega c=2\pi f0)$, but in the case where several matrices $Kij^T(\omega)$ are obtained as a result of step E50, these steps are applied to each of the matrices $Kij^T(\omega)$ obtained.

The matrix $K^{T0}(\omega c)$ is then filtered by the filtering module 6C of the validation device 6 (step E60). The filtering accomplished by the filtering module 6C consists of projecting the matrix $K^{T0}(\omega c)$ onto a single scattering sub-space determined in conformity with the invention, as detailed hereafter with reference to FIG. 4.

Figure 4:
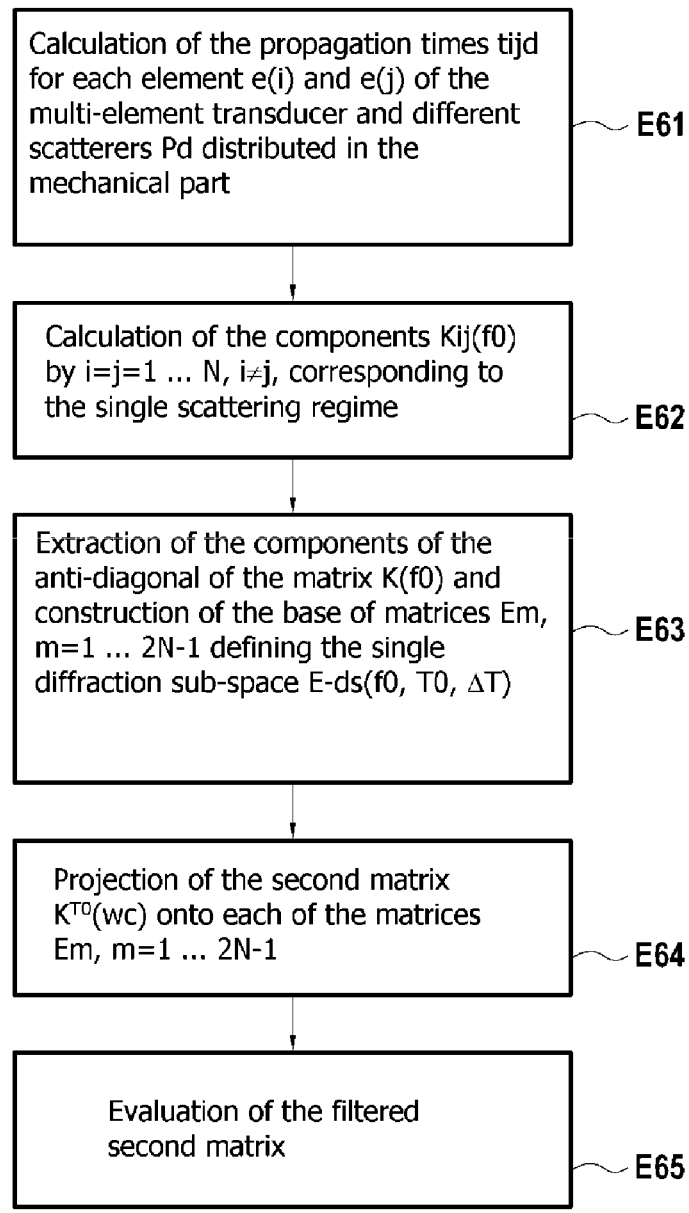
FIG. 4 shows the main steps implemented during filtering performed by the validation device of FIG. 2 in conformity with the invention.

FIG. 4 illustrates the main steps implemented by the filtering module 6C to determine the single scattering sub-space denoted hereafter E_ds(f0,T0,ΔT) on which the matrix $K^{T0}(\omega c)$ is projected and to filter the matrix $K^{T0}(\omega c)$ during the filtering step E60.

The single scattering sub-space determined by the filtering module 6C advantageously takes into account the experimental assumptions considered, namely not only the shape of the mechanical part 2, but also the frequency (here ωc=2πf0) and the time reference T0 considered to determine the matrix $K^{T0}(\omega c)$ that is it desired to filter (neglected here is the time slice ΔT taken around T0, assumed to be relatively narrow).

It is noted as a corollary, that when the determination modules 6A and 6B determine several matrices, this single scattering sub-space differs from one matrix to another.

In the embodiment described here, the single scattering sub-space E_ds(f0,T0,ΔT) is defined by the filtering module 6C base d on a base comprising 2N−1 matrices denoted Em, m=1, . . . , 2N−1. To determine this base of matrices, the filtering module 6C, via its module 6C1 (third determination module within the meaning of the invention), uses a ray tracing algorithm which allows it to calculate numerically the components of each of the matrices Em, m=1, . . . , 2N−1, as detailed below.

To perform this calculation, the inventions have relied on the following assumptions and considerations.

Figure 5:
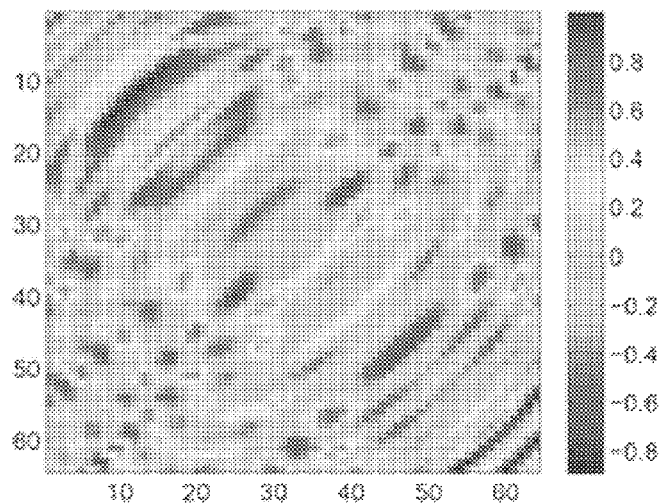
FIG. 5 illustrates the properties of the inter-element matrix measured by the non-destructive testing system of FIG. 1 during the implementation of the testing method according to the invention.

The experimental inter-element matrix $k^{T0}$ comprising the measurement carried out during step E20 can be written in the form of a matrix corresponding to the single scattering regime and a noise matrix. The matrix corresponding to the single scattering regime has a particular form in the frequency domain, characterized by a phase law on its anti-diagonal components, as illustrated graphically in FIG. 5 in a particular example given by way of illustration.

Thus, calculating the single scattering space E_ds(f0,T0,ΔT) onto which the matrix $K^{T0}(\omega c)$ is projected, and more particularly the base of matrices Em, m=1, . . . , 2N−1 defining this sub-space, amounts to calculating the phase law of the anti-diagonal components of the Fourier transform of the inter-element matrix corresponding to the single scattering regime.

If a single scatterer Pd is considered within the material of the mechanical part 2, corresponding to a propagation time tijd of the ultrasonic wave emitted by the element e(i) of the multi-element transducer 3 toward the scatterer d, then returned from the scatterer d toward the element e(j) of the multi-element transducer 3, the component indexed by i and j of the Fourier transform of the inter-element matrix can be written in the form:

$$\exp(j2\pi f(tijd))$$

where j designates the complex element such that $(j)^2=-1$ and f designates the frequency.

To better characterize the scattering of the mechanical part 2, the inventors have considered a plurality D of scatterers Pd, d=1, . . . , D, (D designating an integer greater than 1) distributed over various points of the mechanical part 2. The contribution denoted Hij of this plurality of the scatterers in the single scattering regime is written, for the component indexed by i and j of the Fourier transform of the inter-element matrix:

$$Hij(f)=\Sigma_{d=1,\ldots D} \exp(j2\pi f(tijd)) \quad \text{(Eq. 1)}$$

It is noted that these are scatterers Pd, d=1, . . . , D which have a position in the mechanical part 2 compatible with the time reference considered for constructing the first matrix (in the example of the single scattering sub-space E_ds(f0, T0,ΔT), this time reference is T0). More precisely, the scatterers Pd, d=1, . . . , D are selected so as to be at a depth in the mechanical part 2 determined relative to the multi-element transducer 3 based on the quantity T0; this depth corresponds to the depth reachable by a wave that has propagated into the part 2 and returned to the transducer 3 in a time T0. The lateral position of the scatterer Pd in the part 2 is determined by a random drawing of a number and cannot exceed the lateral dimension of the multi-element transducer 3. The scatterers Pd, d=1, . . . , D are therefore all located at the same depth, but at different and random lateral positions.

In conformity with the invention, the filtering module 6C is based on the contributions Hij(f) thus calculated, and more specifically in the contributions Hij(f0) calculated by means of the equation (Eq. 1) at the frequency f0, to determine the base of matrices Em, m=1, . . . , 2N−1 defining the single scattering sub-space E_ds(f0,T0,ΔT). The components Hij (f0) calculated by the filtering module 6C correspond to an estimate of the contribution of the single scattering regime to the frequency components of the second matrix $K^{T0}(\omega c)$, reflecting the measurements carried out by the multi-element transducer 3, on other words the value the frequency components of the second matrix should have if they were not tainted by noise and were only linked to a single scattering regime in the mechanical part 2 (the multiple single scattering regime is assimilated to a noise in the same manner as the electronic noise). The components Hij(f0) thus calculated by the filtering module 6C form a third matrix H(f0) within the meaning of the invention.

Due to the property mentioned above and illustrated in FIG. 5 of the matrix corresponding to the single scattering regime (phase law on the anti-diagonal), the filtering module 6C is configured to extract the components located on the anti-diagonal of the third matrix H(f0) and to construct the matrices Em from the components thus extracted, as described in more detail hereafter.

We will now describe in more detail the third aforementioned operations accomplished by the filtering module 6C for constructing the matrices Em and calculating numerically the single scattering sub-space E_ds(f0,T0,ΔT).

The evaluation of the equation (Eq. 1) for f=f0 requires the estimation by the filtering module 6c of the propagation times tijd (step E61). To calculate the propagation times tijd associated with the different scatterers Pd, d=1, . . . , D considered in the mechanical part 2, the filtering module 6C uses a ray tracing algorithm. An algorithm of this type allows, in known fashion, linking each element e(i) and each element e(j) of the multi-element transducer 3, i≠j, with a selected scatterer Pd at a point in the mechanical part 2 and located at a depth corresponding to the time reference T0, by a path compatible with the Snell-Descartes laws, as illustrated in FIG. 6.

Figure 6:
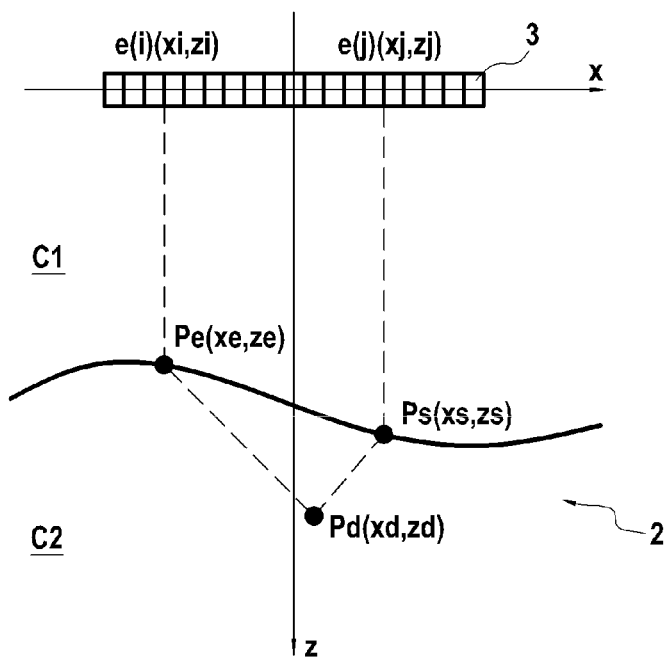
FIG. 6 shows a path considered by the ray-tracing algorithm used during the testing method in conformity with the invention.

FIG. 6 shows, in a plane (x, z), a selected scatterer Pd within the mechanical part 2 as previously indicated. The scatterer Pd has as coordinates (xd, zd) in the plane (x, z). The ray tracing algorithm used by the filtering module 6C advantageously allows determining one (or more) realistic path(s) ("rays") with regard to the laws of physics linking the element e(i) of the multi-element transducer 3 with coordinates (xi, zi) in the plane (x, z) to the scatterer Pd, then linking the scatterer Pd to the element e(j) of the multi-element transducer 3 with coordinates (xj, zj) in the plane (x, z), and calculating the propagation times tijd of the ultrasonic wave propagating along this (these) path(s). It advantageously takes into account the form of the interface between the multi-element transducer 3 and the mechanical part 2.

According to a realistic path of this type, an ultrasonic wave emitted by the element e(i) penetrates (enters) into the material of the mechanical part 2 at a point Pe with coordinates (xe, ze) in the plane (x, z), and leaves the mechanical part, after scattering by the scatterer Pd, by the exit point Ps with coordinates (xs, zs) in the plane (x, z). To determine this path, the ray tracing algorithm emits the wave from the element e(i) in various directions (these constitute the "rays"; for example the algorithm considers a ray every 0.1° in a 90° cone oriented toward the mechanical part 2) and retains the direction allowing the wave to pass through the interface and arrive near the scatterer Pd considered (for example, a proximity condition is set based on the constraint of having the ratio of the residual distance to the width of the transducer less than a predetermined threshold, typically $10^{-3}$).

Once this realistic path is determined, the ray tracing algorithm calculates the propagation time tijd by applying the following formula:

$$tijd = \min_{Pe} tid(Pe) + \min_{Ps} tdj(Ps)$$

where tid(Pe) designates the propagation time of the ultrasonic wave from the element e(i) of the transducer 3 to the scatterer Pd taking the path entering the mechanical part 2 through the point Pe, and tdj(Ps) designates the propagation time of the ultrasonic wave from the scatterer Pd to the element e(j) of the transducer 3 when it takes the path exiting the mechanical part 2 through the point Ps. The propagation times tid(Pe) and tjd(Ps) are calculated in the following manner by the ray tracing algorithm for each couple of points (Pe, Ps) determined by the ray tracing algorithm:

$$tid(Pe) = \frac{\sqrt{(xe-xi)^2 + (ze-zi)^2}}{c1} + \frac{\sqrt{(xd-xe)^2 + (zd-ze)^2}}{c2}$$

where c1 designates the speed of propagation of the ultrasonic wave in the medium separating the multi-element transducer 3 from the mechanical part 2 (ex: propagation speed in water if the mechanical part 2 is submerged in a tank of water and the multi-element transducer 3 is displaced on the surface of the tank), and c2 designates the propagation speed of the ultrasonic wave in the material of the mechanical part 2; and $$tdj(Ps) = \frac{\sqrt{(xd-xs)^2 + (zd-zs)^2}}{c2} + \frac{\sqrt{(xs-xj)^2 + (zs-zj)^2}}{c1}$$

The result of the foregoing is that the use of the ray tracing algorithm allows the determination module 6C1 to calculate the propagation times tijd while taking into account the shape of the mechanical part 2, but also the placement of the multi-element transducer 3 of the media in which the ultrasonic waves emitted during the measuring step E20 are propagated between the elements e(i) and e(j) of the transducer and each scatterer Pd.

It is noted that the number of paths (and of points Pe and Ps corresponding to these paths) considered by the ray tracing algorithm to determine tijd is configurable and depends on a complexity/accuracy compromise that it is desired to attain (the greater the number paths considered, the better is the accuracy of calculation of tijd). In practice, the inventors have noted that a number greater than or equal to 20 paths per degree allows attaining a satisfactory complexity/accuracy compromise.

Based on the propagation times tijd thus calculated by the filtering module 6C by means of the ray tracing algorithm, it calculates the components Hij(f0) of the third matrix H(f0) representing the contribution of the single scattering regime via its determination module 6C1 as previously mentioned, by applying the equation (Eq. 1) to the frequency f=f0 (step E62):

$$Hij(f0) = \sum_{d=1,\ldots D} \exp(j2\pi f0(tijd))$$

Then the determination module 6C1 extracts the components of the anti-diagonal of the third matrix H(f0) to construct the base of matrices Em, m=1, ..., 2N−1. More particularly, it determines the components Em(i, j), i,j=1, ..., N of each matrix Em in the following manner (step E63):

$$Em(i, j) = \begin{cases} \frac{g(i-j)}{A(m)} & \text{if } i+j = m+1 \\ 0 & \text{else} \end{cases}$$

where the function g(x) is defined by the relations:
if N is odd, or N=2M+1:

$$g(x) = H(M+1-x)(M+1+x)$$

with x an integer ranging from −M to M;
if N is even, or N=2M:

$$g(x) = H(2M-x)(1+x)$$

with x an integer ranging from 0 to 2M−1;
and A(m) is a normalization function such that:

$$A(m) = \begin{cases} m & \text{if } m \leq N \\ 2N-m & \text{if } m > N \end{cases}$$

The matrix base Em, m=1, ..., 2N−1 thus constructed by the determination module 6C1 of the filtering module 6C defines the single scattering sub-space used by the filtering module 6C to filter the second matrix $K^{T0}(\omega c)$. To accomplish this filtering, the filtering module 6C, via its projection module 6C2, projects the second matrix $K^{T0}(\omega c)$ onto each of the matrices Em, m=1, ..., 2N−1 (step E64). More specifically, it calculates for m=1, ... 2N−1 the projection denoted pm of the matrix $K^{T0}(\omega c)$ into each of the matrices Em according to (step E64):

$$pm = \langle K^{T0}(\omega c) | Em \rangle$$

where $\langle A|B \rangle = Tr(AB^*)$ where Tr(M) designates the trace of the matrix M and M* designates the conjugate transpose of the matrix M.

Then the filtering module 6C via its evaluation module 6C3, evaluates the second filtered matrix (denoted below $FK^{T0}(\omega c)$) by summing the set of matrices of the base weighted respectively by the projections obtained on these bases, or (step E65):

$$FK^{T0}(wc) = \sum_{m=1}^{2N-1} pmEm$$

This completes the filtering step E60 implemented by the filtering module 6C of the validation device 6. The filtered matrix $FK^{T0}(\omega c)$ obtained is then supplied to the analysis module 6D of the validation device 6 for analysis and detection of indications of defects, if any, in the mechanical part 2 (step E70 of FIG. 3).

If several matrices were determined at the end of step E50, the step E60 is implemented on each of these matrices, and the set of filtered matrices is supplied to the analysis module 6D.

No limitation is attached to the algorithm used by the analysis module 6D to verify the integrity of the mechanical part 2, and to detect the presence of a defect, if any, in the mechanical part 2 based on the filtered matrix(ices) which are supplied to it.

Thus for example, the analysis module 6D can use for this purpose a DORT technique of diagonalizing the time reversal operator as described in particular in the document of C. Prada et al. entitled: "Eigenmodes of the time reversal operator: a solution to selective focusing in multiple-target medias," *Wave Motion*, vol. 20 no. 2 pages 151-163, 1994. It can proceed to this end as described in document WO 2010/001027 by considering a threshold on the first singular value of the filtered matrix.

As a variant, the analysis module 6D can use a total focusing method as described in the document of C. Holmes et al. entitled "Post-processing of the full matrix of ultrasonic transmit-receive array data for non-destructive evaluation," *NDF E. International*, vol. 38, pages 701-711, 2005.

These examples are given, however, only by way of illustrative examples, and other algorithms can be considered for verifying the integrity of the mechanical part 2 based on the filtered matrix $FK^{T0}(\omega c)$.

If a defect is detected by the analysis module 6D during the verification step E70 (yes response to the teststep E80), the mechanical part 2 is declared to be non-conforming (or invalid) and rejected (step E90).

If no defect is detected (no response to the teststep E80), the mechanical part 2 is validated (step E100), and can be used in conformity with its final destination (i.e. assembled into the aircraft engine for which it is intended in the example considered here).

The invention therefore advantageously allows non-destructive testing of a mechanical part by means of ultrasonic waves emitted by a multi-element transducer, regardless of the shape of this mechanical part and regardless of the complexity of the interface between the multi-element transducer and the mechanical part. The filtering achieved in conformity with the invention allows a substantial reduction in the noise present in the measurement accomplished by means of the multi-element transducer which allows improving the effectiveness of the non-destructive testing subsequently carried out. Thus the invention can apply to numerous industrial sectors in which the destructive testing of mechanical parts is considered.

The invention claimed is:

1. A method for the non-destructive testing of a mechanical part by propagation of ultrasonic waves accomplished by means of a multi-element transducer placed opposite the mechanical part and comprising a plurality of piezoelectric elements e(1), e(2), . . . , e(N), N designating an integer greater than 1, said testing method comprising:
    a measuring step comprising, for each element e(i) of the transducer, the emission of an ultrasonic wave at a given frequency and the measurement, by each element e(j) of the transducer distinct from the element e(i), of a time-varying signal denoted kij(t) representing the back-scattered ultrasound wave received by the element e(j);
    a step of determining at least one first matrix of time-varying components based on the measured signals kij(t), i, j=1, . . . , N, taken over a predetermined duration around a time reference denoted T;
    a step of determining at least one second matrix of frequency components corresponding to a predetermined frequency based on the frequency of the sound wave by applying a Fourier transformation to the time-varying components of said at least one first matrix;
    a step of filtering said at least one second matrix comprising a projection of said at least one second matrix of frequency components onto a single scattering sub-space; and
    a step of verifying the integrity of the mechanical part by using said at least one filtered second matrix;
        the testing method being characterized in that the single scattering sub-space used during the filtering step is determined by means of a numerical calculation using a ray tracing algorithm.

2. The testing method according to claim 1, wherein the step of filtering said at least one second matrix comprises:
    a step of determining the single scattering sub-space, said single scattering sub-space being defined based on a base of 2N−1 matrices denoted Em, m=1, . . . , 2N−1, said determining step comprising:
        for each couple of distinct elements e(i) and e(j) of the transducer, i, j,=1, . . . , N, a numerical calculation step using a ray-tracing algorithm, for a plurality D of scatterers denoted Pd, d=1 . . . , D distributed in various points of the mechanical part and situated at a depth determined from the time reference T, of a propagation time tijd of an ultrasonic wave emitted by the element e(i), diffracted by the scatterer Pd and received by the element e(j), the propagation time tijd being calculated taking into account the shape of the mechanical part, the placement of the transducer and the media in which the ultrasonic wave is propagated between the elements e(i) and e(j) of the transducer and the scatterer Pd;
        a step of estimating a contribution of single scattering in the frequency components of the second matrix, based on the propagation times calculated for each couple of distinct elements e(i) and e(j) of the transducer, said estimating step supplying a third matrix;
        a step of extracting the frequency components from a central anti-diagonal of the third matrix to construct the matrix base Em, m=1, . . . , 2N−1 defining the single scattering sub-space;
    a step of projecting said at least one second matrix onto each of the matrices Em, m=1, . . . , 2N−1 of the base of 2N−1 matrices; and a step of evaluating said at least one filtered second matrix by summing the matrices Em of the base weighted by the projections obtained during the projection step.

3. The testing method according to claim 2, wherein each propagation time tijd is calculated according to:

$$tijd = \min_{P_e} tid(Pe) + \min_{P_s} tdj(Ps)$$

where Pe designates an entry point with coordinates (xe, ze) of the ultrasonic wave into the mechanical part and Ps an exit point with coordinates (xs, zs) of the ultrasonic wave diffracted by the point Xd with coordinates (xd, zd), with:

$$tid(x) = \frac{\sqrt{(xe - xi)^2 + (ze - zi)^2}}{c1} + \frac{\sqrt{(xd - xe)^2 + (zd - ze)^2}}{c2}$$

and $$tdj(x) = \frac{\sqrt{(xd - xs)^2 + (zd - zs)^2}}{c2} + \frac{\sqrt{(xs - xj)^2 + (zs - zj)^2}}{c1}$$

where c1 designates the propagation speed of the ultrasonic wave in the medium separating the transducer from the mechanical part and c2 designates the propagation speed of the ultrasonic wave in the mechanical part.

4. The testing method according to claim 1, wherein the mechanical part is a billet or a fan disk or a one-piece impeller of an aircraft engine.

5. The testing method according to claim 1, wherein several first matrices corresponding to different time references and/or to different predetermined durations are determined.

6. The testing method according to claim 1, wherein said at least one second matrix is determined at the frequency of the ultrasonic wave.

7. The testing method according to claim 6, wherein several second matrices are determined at a plurality of frequencies contained in a predetermined interval around the frequency of the ultrasonic wave.

8. The testing method according to claim 1, in which the step of verifying the integrity of the mechanical part uses a DORT technique of diagonalization of the time reversal operator or a total focusing method.

9. A system for non-destructively testing a mechanical part comprising:
  a multi-element transducer placed opposite the mechanical part and capable of emitting ultrasonic waves, said transducer comprising a plurality of piezoelectric elements e(1), e(2), . . . , e(N), N designating an integer greater than 1, said transducer being configured to emit, via each element e(i) of the transducer, an ultrasonic wave at a given frequency, and to measure, via each element e(j) of the transducer distinct from the element e(i), a time-varying signal denoted kij(t) representing the back-scattered ultrasonic wave received by the element e(j);
  a validation device comprising:
    a first determination module, configured to determine at least one first matrix of time-varying components based on the measured signals kij(t), i, j=1, . . . , N, taken for a predetermined duration around a time reference denoted T;
    a second determination module, configured to determine at least one second matrix of frequency components corresponding to a frequency determined based on the frequency of the sound wave by applying a Fourier transformation to the time-varying components of said at least one first matrix;
    a filtering module, configured to filter said at least one second matrix by projecting said at least one second matrix of frequency components onto a single scattering sub-space; and
    an analysis module, configured to verify the integrity of the mechanical part by using said at least one filtered second matrix;
  the testing system being characterized in that said filtering module is configured to determine the single scattering sub-space by means of a numerical calculation using a ray tracing algorithm.

10. The testing system according to claim 9, wherein said filtering module comprises:
  a third determination module, configured to determine the single scattering sub-space based on a base of 2N−1 matrices denoted Em, m=1, . . . , 2N−1, said third determination module being configured to:
    for each couple of distinct elements e(i) and e(j) of the transducer, i, j, =1, . . . , N, calculate numerically, but using a ray-tracing algorithm, for a plurality D of scatterers denoted Pd, d=1 . . . , D distributed in various points of the mechanical part and situated at a depth determined from the time reference T, a propagation time tijd of an ultrasonic wave emitted by the element e(i), diffracted by the scatterer Pd and back-scattered by the element e(j), said propagation time being calculated taking into account the shape of the mechanical part, the placement of the transducer and the media in which the ultrasonic wave is propagated between the elements e(i) and e(j) of the transducer and the scatterer Pd;
    estimate a contribution of single scattering in the frequency components of the second matrix, based on the propagation times calculated for each couple of distinct elements e(i) and e(j) of the transducer, and obtaining a third matrix based on the estimated contributions;
    extract frequency components from a central anti-diagonal of the third matrix to construct the matrix base Em, m=1, . . . , 2N−1 defining the single scattering sub-space;
  a projection module, configured to project said at least one second matrix onto each of the matrices Em, m=1, . . . , 2N−1 of the base of 2N−1 matrices; and
  an evaluation module configured to evaluate said at least one filtered second matrix by summing the matrices Em of the base weighted by the projections obtained during the projection step.

11. The testing system according to claim 9, also comprising a robotic arm on which is placed the multi-element transducer, said robotic arm being configured to allow displacement of the multi-element transducer around the mechanical part.

12. The testing system according to claim 9, wherein the transducer is linear.

* * * * *